(12) United States Patent
Colombo et al.

(10) Patent No.: US 7,195,835 B2
(45) Date of Patent: Mar. 27, 2007

(54) PROTON CONDUCTING MEMBRANE FOR FUEL CELLS

(75) Inventors: Daniel G. Colombo, Altamont, NY (US); Michael Krumpelt, Naperville, IL (US); Deborah J. Myers, Lisle, IL (US); John P. Kopasz, Bolingbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 11/291,254

(22) Filed: Dec. 1, 2005

(65) Prior Publication Data

US 2006/0094792 A1    May 4, 2006

Related U.S. Application Data

(62) Division of application No. 10/105,203, filed on Mar. 25, 2002, now Pat. No. 6,977,122.

(60) Provisional application No. 60/278,979, filed on Mar. 27, 2001.

(51) Int. Cl.
*H01M 8/10* (2006.01)
*C08J 5/20* (2006.01)
*B01D 39/00* (2006.01)

(52) U.S. Cl. .......................... 429/33; 429/307; 521/28; 210/500.27; 528/482

(58) Field of Classification Search .................. 429/33, 429/46, 307, 314, 317; 521/27; 210/500.27; 528/480, 482
See application file for complete search history.

(56) References Cited

U.S. PATENT DOCUMENTS 5,833,854 A    11/1998  Zwijnenburg et al.

6,177,414 B1 *  1/2001  Tomalia et al. ............. 514/159
6,312,809 B1   11/2001  Crooks et al.
2002/0177039 A1  11/2002  Lu et al.
2003/0050433 A1   3/2003  Agarwal et al.

FOREIGN PATENT DOCUMENTS

EP    0477541 B1    4/1992

OTHER PUBLICATIONS

Hammond, P., "1997 Progress Report: Design and Synthesis of Dendrimer Block Copolymers as Nanoporous Membrances for Environmental Separation Applications," National Center for Environmental Research, U.S. EPA, 1997.

Rikukawa et al., "Proton-conducting polymer electrolyte membranes based on hydrocarbon polymers," *Progress in Polymer Science*, vol. 25, pp. 1463-1502, 2000, published by Elsevier Science Ltd.

Schlüter et al., "Dendronized Polymers: Synthesis, Characterization, Assembly at Interfaces, and Manipulation," *Angew. Chem. Int. Ed.*, vol. 39, 864-883, 2000, published by WILEY-VCH Verlag GmbH.

* cited by examiner

Primary Examiner—David W. Wu
Assistant Examiner—M. Bernshteyn
(74) Attorney, Agent, or Firm—Foley & Lardner LLP

(57) ABSTRACT

An ion conducting membrane comprising dendrimeric polymers covalently linked into a network structure. The dendrimeric polymers have acid functional terminal groups and may be covalently linked via linking compounds, cross-coupling reactions, or copolymerization reactions. The ion conducting membranes may be produced by various methods and used in fuel cells.

12 Claims, 2 Drawing Sheets

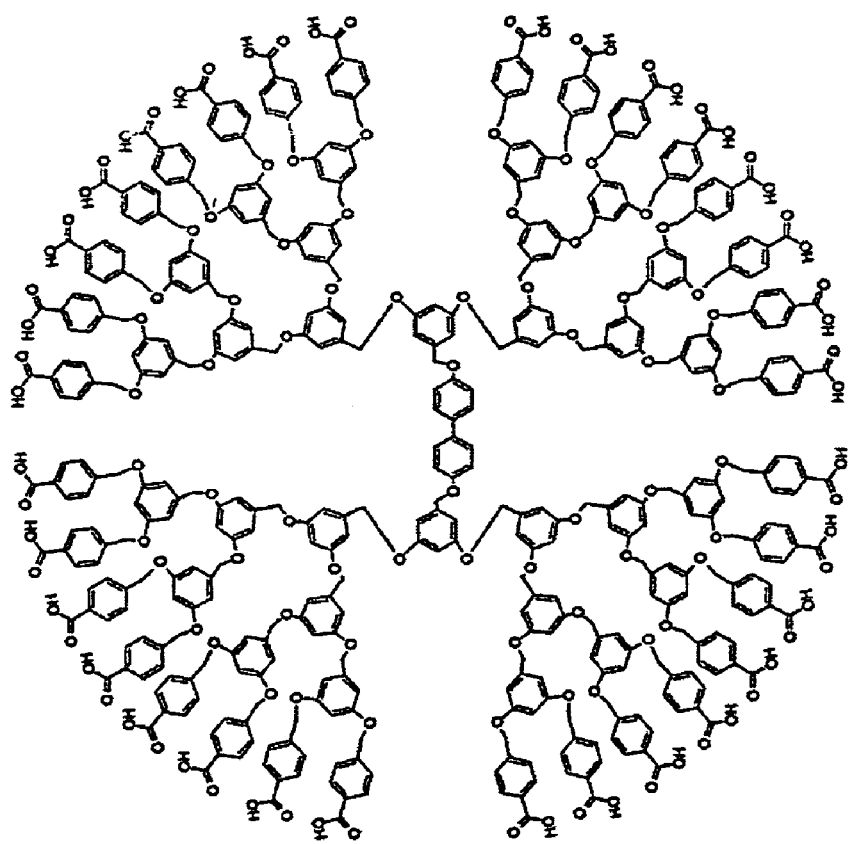
FIG. 1 A Frechét-type dendrimer.

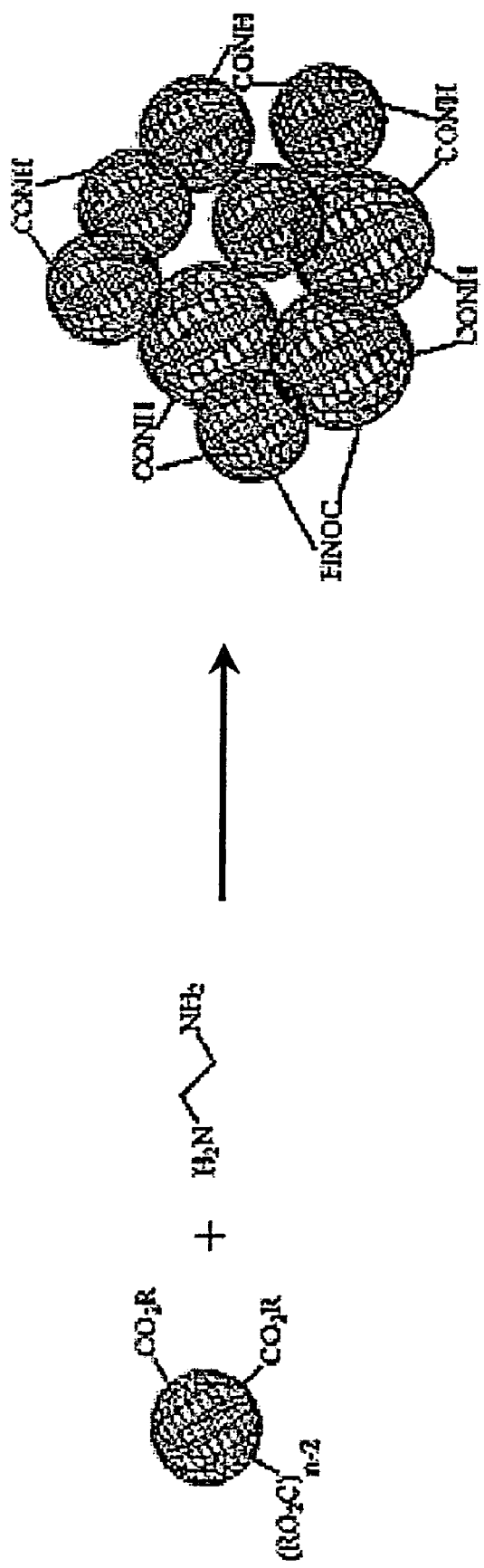
FIG. 2 Formation of a random network of Frechét-type dendrimers covalently linked with diamine compounds.

PROTON CONDUCTING MEMBRANE FOR FUEL CELLS

CROSS-REFERENCES TO RELATED APPLICATIONS

This application is a divisional application of U.S. application Ser. No. 10/105,203 filed Mar. 25, 2002 now U.S. Pat. No. 6,977,122, which claims priority to U.S. Provisional Application No. 60/278,979 filed Mar. 27, 2001, the entire disclosures of which are incorporated herein by reference.

GOVERNMENT INTERESTS

This invention was made with Government support under Contract No. W-31-109-ENG-38 awarded by the Department of Energy. The Government has certain rights in this invention.

FIELD OF THE INVENTION

This invention relates to proton or hydronium ion conducting membranes built up from dendrimers that are covalently linked together to form macromonomers and larger nanoscale polymer objects. The invention also relates to fuel cells made from the membranes.

BACKGROUND OF THE INVENTION

The proton or hydronium ion conducting membranes that are currently used in polymer electrolyte membrane fuel cells (PEMFCs) and direct methanol fuel cells (DMFCs) are typically linear or comb polymers that have sulfonic, carboxylic, or phosphonic acid groups located at the end of short branches extending from a fluorocarbon or hydrocarbon polymer backbone. In a fuel cell, these membranes are coated with an anode and a cathode on opposite sides, and then stacked between bipolar plates. In the polymer electrolyte membrane fuel cell, hydrogen gas and air are passed over the anode and cathode respectively to generate electricity. In the direct methanol fuel cell, a dilute solution of methanol is used as fuel. In conventional membranes the terminal acid groups self-organize into hydrophilic domains that are delineated by the hydrophobic fluorocarbon or hydrocarbon backbone of the polymer and form channels that contain water. The ionic conductivity of these membranes depends on the number of acid sites per unit weight of the polymer, and on the ability to maintain the proper water content within the polymer membrane. More acid sites provide more protons or hydronium ions to enhance the ionic conductivity. Because proton transport is facilitated by water, higher water content within the membrane also translates into higher conductivity. However, if the water content of the membrane becomes too high, it will lead to swelling of the membrane and a subsequent loss of mechanical strength. Conversely, if the water content of the membrane is too low, then this will lead to a loss in ionic conductivity. This creates a problem when trying to operate these membranes at temperatures above 100° C., which is where one would like to operate a fuel cell to limit the negative effects of carbon monoxide on the fuel cell performance. As the temperature is increased above 100° C., the water content in the polymer decreases and the conductivity drops off drastically. In addition, these membranes suffer from methanol crossover, the diffusion of methanol through the membrane with the water present in the membrane, when used with DMFCs. The performance of DMFCs is severely limited by methanol crossover through the polymer electrolyte membrane, where as much as 40% of methanol can be lost as it diffuses from the anode to the cathode compartment of the fuel cell.

Methanol crossover arises because methanol is readily transported from the anode to the cathode through the hydrophilic channels within the proton-conducting membrane by bulk diffusion. Methanol is also transported as part of the solvation shell around the proton (electroosmotic drag). The ratio of methanol molecules to water molecules solvating the proton is identical to their concentration ratio in solution. Thus, electroosmotic drag increases as the methanol concentration in the fuel increases. Electroosmotic drag of methanol is responsible for the sharp decline in DMFC performance at elevated methanol concentrations. Elimination of electroosmotic drag would allow the use of higher concentrations of methanol, which would increase the fuel efficiency of the DMFC power source.

The problem of methanol crossover is further complicated because the current efforts in membrane development remain focused on increasing power densities and mechanical durability while decreasing the acid-equivalent weight (EW) and membrane thickness. The EW number is a good measure for the ionic conductivity of the polymer. It is defined as the molecular weight of polymer per acid group. The lower the EW number, the higher the acid density on the polymer and the higher the proton conductivity. For example, an EW of 1100 means that for every mole of sulfonic acid there are 1100 grams of fluorocarbon polymer backbone. Commercially available NAFION (perfluorosulfonic acid polymer) is typical of the perfluorinated ionomer membranes used in practical fuel cells. The membrane consists of a fluorinated polymer backbone with strongly acidic functional groups attached to the polymer chain. NAFION membranes have relatively high EWs and low specific conductivities (1100 and 0.081 $\Omega^{-1}$ cm$^{-1}$, respectively, for NAFION 117). For comparison, the similar Dow® membranes are somewhat better, with EWs of 800 and 850 for specific conductivities of 0.20 and 0.12 $\Omega^{-1}$ cm$^{-1}$, respectively. Therefore, decreasing the EW results in markedly higher proton conductivities while a thinner membrane reduces ionic resistance. These factors together yield an increase in the DMFC power density and overall membrane performance. However, reductions in the EW have been accompanied by an increase in methanol crossover, and thinner membranes tend to exhibit reduced durability with an increased risk of methanol crossover.

The elimination or reduction of methanol crossover in a fuel cell would decrease the size of a fuel cell stack needed for a mobile power source, decrease the loss of fuel, and allow the use of higher concentrations of methanol in the fuel cell. With presently used proton conducting membranes, any decrease in methanol permeability also correlates with decreased proton conductivity.

Thus, a need exists for a durable proton conductive membrane having a low EW and high resistance to methanol crossover.

SUMMARY OF THE INVENTION

The present invention provides proton and hydronium ion conducting polymer electrolyte membranes that use dendrimeric polymers as macromonomers that can be covalently assembled into network structures and nanoscale objects. Such membranes are able to decrease methanol crossover without increasing the EW of the membranes by decoupling protonic conductivity and water content. By utilizing dendrimers having acid functional terminal groups, the membranes of this invention obtain a higher number of acid sites per unit weight of polymer than membranes made from linear and comb polymers. In addition, the use of dendrimer membranes allows for control of membrane pore size to limit the water content in the pores. This allows for operation at higher temperatures and reduces methanol crossover in direct methanol fuel cells. As is generally the case for cross-linked polymers, membranes fabricated in this manner should also be thermally stable well above the glass transition temperature for a given dendrimer.

The membranes have many potential uses, including, but are not limited to, ionic conducting membranes for polymer electrolyte membrane fuel cells (PEMFC) and membranes for direct methanol fuel cells (DMFC). The dendrimers are prepared from several stepwise syntheses that provide control over the dendrimer size and allow for tuning the chemical functionality on the terminus of the dendrimer. Using this approach, the ion transport properties of the membranes can be controlled.

The membranes of the present invention offer several advantages over the prior art. The pore structure of the dendrimer membranes results from the void volume that exists between adjacent dendrimers, and is a function of how the dendrimers pack together and the size of the molecular linker used. By controlling the size of the dendrimers and the linking groups, one can control the size of the pores thereby limiting the water content in the pores. Also, by utilizing hyperbranched polymers, a higher number of acid sites per unit weight of polymer can be obtained, increasing the ionic conductivity compared to a linear polymer. In addition, the network structure formed by covalently linking dendrimers together will make the ionomer membrane resistant to swelling. In one embodiment of the invention the membrane will have a thickness of between about 0.02 and about 0.2 millimeters.

Another advantage offered by the dendrimers of the present invention is that proton or hydronium ion transport may proceed on the surface of the spherical dendrimers, much like grain boundary diffusion in solids. This drastically decreases the dependence of the ionic transport on the water content. Given the higher thermal stability and anticipated ionic transport mechanism, these membranes should be useful in higher temperature regimes (100–200° C.).

The membranes are formed by covalently linking dendrimers having acid functional terminal groups. The dendrimers can be linked through amido or imido bridges, as well as other bridging groups, to form a network polymer that is cast into a membrane. This approach leads to a random covalent network. Alternatively, synthetic strategies can be used in order to cross-couple or copolymerize dendrimers via specific terminal functional groups other than the acid functional groups. Numerous synthetic methods are available to selectively cross-couple specific functional groups, such as halide or hydroxyl groups, to form stable covalent links between modified dendrimers. This offers the advantage of directing the assembly of the dendrimers as macroscopic building blocks for an ionomer membrane, and it has implications for controlling the pore microstructure of the membrane on a molecular level.

One example of a suitable dendrimer is the Frechét-type dendrimer. The aryl-ether linkage structure of Frechét-type dendrimers is robust and leads to a membrane that exhibits significant resistance toward chemical attack within the highly corrosive fuel cell environment.

BRIEF DESCRIPTION OF THE DRAWINGS

In the drawings:
FIG. 1 shows an example of a Frechét-type dendrimer.
FIG. 2 shows a representation of a portion of a membrane according to the present invention comprised of spherical dendrimers covalently linked with diamine compounds.

DETAILED DESCRIPTION OF THE INVENTION

The present invention provides ion-conducting membranes based on covalent assemblies of highly functionalized and covalently cross-linked hyperbranched dendrimers. The present invention also provides fuel cells made from the membranes. The dendrimers are terminated with acid functionalities and can be covalently bound into a dendrimeric network by a variety of dendrimer-linking reactions. The covalently-linked networks can be cast into membranes which, in turn, can be incorporated into fuel cells.

Dendrimers having poly (aryl ether) linkages are well suited for use in the present invention. Frechét-type dendrimers, which contain poly (aryl ether) linkages, are particularly suited for use in constructing the membranes of this invention. FIG. 1 shows an example of a Frechét-type dendrimer. This dendritic polyether macromolecule can be made by a convergent synthesis using 3,5-dihydroxybenzyl alcohol as its basic building block and with carboxylic acid groups as chain ends. Methods for making Frechét-type dendrimers are well known in the art. For example, one route to this dendrimer has been described by Hawker et al. J. Chem. Soc. Perkin Trans. (1993) 1, 1287, which is incorporated herein by reference. Briefly, two equivalents of methyl-p-bromomethylbenzoate are reacted with 3,5-dihydroxybenzyl alcohol in the presence of 18-crown-6 and potassium carbonate in refluxing acetone. The resulting first generation alcohol is converted to the bromide by reaction with carbon tetrabromide/triphenylphosphine. Reaction of two equivalents of this bromide with 3,5-dihydroxybenzyl alcohol leads to the second generation dendrimer. These steps are repeated to get to generation 3, then 4 dendrimers. At generation 4, two equivalents of brominated generation 4 dendrimer are reacted with 4,4'-dihydroxy biphenyl to provide a macromolecule. The methyl ester groups are then converted by reaction with excess potassium hydroxide to provide the carboxy terminated dendrimer.

The resulting macromolecule exhibits a polymer architecture that is perfectly hyperbranched, and is equivalently envisioned as being a unimolecular micelle or globular amphiphile. In fact, this type of dendrimer, especially at high molecular weights, closely approximates a rigid sphere whose structural integrity is largely independent of the nature of the solvent and its concentration in that solvent. This contrasts markedly with linear polymers, which are random coils whose size and shape vary as a function of solvent and concentration. As such, this type of dendrimer is well suited for use as a structurally discrete, macromolecular building block for larger, nano- and mesoscale objects such as organic films, composite materials and membranes. The internal aryl-ether linkage structure of this dendrimer is robust and should lead to a membrane that exhibits significant chemical stability toward chemical attack within the highly corrosive fuel cell environment. Additional protection against adventitious peroxide radicals generated in situ within a fuel cell results from the compact globular structure each dendrimer maintains in a high ionic strength medium, i.e., $pH \leq 1.0$. Because this type of dendrimer is surface-functionalized with 32 carboxylic acid groups, membranes fabricated using these dendrimers as building blocks will possess low acid equivalent weights, estimated to range between about 150 and about 500. In some embodiments the EW will be between about 200 and about 400, and in other embodiments between about 240 and about 250, which is a striking improvement compared to current membranes (1100 to 800 for NAFION (perfluorosulfonic acid polymer) and Dow membranes, respectively). The large decrease in the EW results in markedly higher proton-conductivities and leads to a more hydrophilic structure. The greater hydrophilicity leads to a structure that retains some water at temperatures above 100° C. and leads to improved performance at these temperatures compared to current membranes. Moreover, it is believed that proton or hydronium ion transport proceeds on the surface of the spherical or globular dendrimers, much like grain boundary diffusion in solids. This drastically decreases the dependence of the ionic transport on the water content. Due to the higher thermal stability and ionic transport mechanism, these membranes are useful in higher temperature regimes (100–200° C.).

In one embodiment, the dendrimers are fluorinated dendrimers. In this embodiment dendrimers, including dendrimers with fluorinated substituents just at the outer edges of the dendrimer, are used to construct the membrane. Fluorinated dendrimers can be synthesized using fluorinated analogues to the precursor molecules used to make the Frechét-type dendrimers. To provide a perfluorinated dendrimer, perfluorinated analogs of the starting materials for the unfluorinated dendrimers would be used throughout the synthesis. Methods for making these dendrimers are well known in the art. For example, a description of a method for making such dendrimers can be found in Miller, T. M., Neenan, T. X., Zayas, R., Bair, H. E., J. Am. Chem. Soc. (1992) 114, 1018, which is herein incorporated by reference. Briefly, to obtain a dendrimer with fluorine only at the outer surface, two equivalents of methyl-p-bromomethyl(tetrafluoro)benzoate can be reacted with 3,5-dihydroxybenzyl alcohol in the presence of 18-crown-6 and potassium carbonate in refluxing acetone. The resulting first generation alcohol would have fluorinated aryl groups at the outer surface which would be carried along throughout the synthesis of higher generation dendrimers. Likewise, to provide further steric protection, 2,6-trifluoromethyl-bromomethylbenzoate can be utilized in place of p-bromomethylbenzoate in the first step of the synthetic procedure. This will provide a generation one dendrimer with perfluoromethyl groups at the outer surface. The electronic and steric effects of the fluorinated phenyl substituents and perfluoromethyl substituents would impart greater chemical stability towards peroxide radicals compared to the unfluorinated dendrimer with minimal fluorination.

Other types of dendrimers are also suitable for use in the construction of the membranes of the invention. These include those utilizing direct carbon to carbon linkages between generations of dendrimer rather than ether linkages, or linkages utilizing functional groups containing nitrogen, oxygen, silicon, phosphorous or transition metal heteroatoms, as well as systems based on repeat units utilizing these heteroatoms. Examples include dendrimers formed from multi-substituted aryl compounds, siloxanes, carbosilanes, amines, phosphines and phosphine oxide compounds. Methods for making such dendrimers can be found in F. J. Stoddart and T. Welton, Polyhedron (1999) 18, 3575; H. Lang and B. Luhmann, Adv. Mater. (2001) 13(20), 1523, and K. Takagi, T. Hattori, H. Kunisada, and Y. Yuki, J. of Polym. Sci. Part A-Polym. Chem. (2000) 38(24), 4385, which are herein incorporated by reference. The heteroatoms can be used to tune the geometry by supplying different bond angles and bond distances, and can help tailor the electronic structure to increase chemical stability and/or increase the acidity of the acid groups to increase the conductivity. Examples of multi-substituted aryl compounds include 1,3,5-trihydroxyaryl compounds, 1,3,5-trialkoxyaryl compounds, and 3,5-disubstitutedaryl compounds. Methods for making these dendrimers can be found in Miller, T. M., Neenan, T. X., Zayas, R., and Bair, H. E., J. Am. Chem. Soc. (1992) 114, 1018, and T. M. Miller et. al. ACS Polymer Preprints, (August 1991) 32, 627, which are herein incorporated by reference.

In various embodiments of the invention, dendrimers having phosphonic or sulfonic acid groups or derivatives of sulfonic acids and phosphonic acids as terminal groups, are used instead of dendrimers having carboxylic acid terminal groups. Frechét-type dendrimers with sulfonic acid functionality, may be produced in a controlled manner by replacing the methyl-p-bromomethylbenzoate starting material, described above, with either an amide-protected, sulfonic acid or thiol bromomethylbenzoate. Both 4-(halomethyl)-1-(N,N-dimethyl-sulfonamido)benzene and 4-(halomethyl) benzenethiol (halogen=Cl, Br, I) are the chemical analogues to methyl 4-(bromomethyl)benzoate, which is converted to the carboxylic acid terminal groups to produce carboxylic acid terminated dendrimers. A sulfonic acid derivative is made by reacting two equivalents of 4-bromomethyl-1-(N, N-Dimethylsulfonamido)benzene with 1 equivalent of 3,5-dihydroxybenzyl alcohol in the presence of 18-crown-6 and potassium carbonate in refluxing acetone. The resulting first generation alcohol is converted to the bromide by reaction with carbon tetrabromide/triphenylphosphine. Further generations are prepared in a manner similar to that described above for the production of the carboxylic acid terminated dendrimers. In another route, 2 equivalents of 4-bromomethyl-1-(N,N-dimethylsulfonamido)-benzene can be reacted with one equivalent of the 3,5 dihydroxymethyl ester of benzoic acid and four equivalents of diethyl azodicarboxylate and triphenylphosphine in THF to provide a first generation methylester. This methylester is then reduced with $LiAlH_4$ to produce the first generation alcohol, and the procedure repeated for higher generation dendrimers. The sulfonic acid dendrimer can then be obtained by an acid catalyzed hydrolysis of the sulfonamide dendrimer. Alternatively, the sulfonic acid functionality can be added by converting the terminal groups on the dendrimer to sulfonic acid groups as was performed by Gong, et. al. in A. Gong, Q. Fan, Y. Chen, H. Liu, C. Chen, and F. Xi, J. of Mol. Catal. A: Chem. (2000) 159, 225, which is herein incorporated by reference.

Once the dendrimers have been produced they are covalently linked into a dendrimer network. This can be accomplished by a variety of linking reactions well known in the art. Regardless of the specific coupling method selected, this strategy offers the advantage of directing the assembly of the dendrimers as macroscopic building blocks for an ionomer membrane, with implications for controlling both pore size and the microstructure of the membrane on a molecular level. Water containing networks can be produced by including water into the reaction mixtures. Alternatively, the networks may be exposed to a humidified air from which they will pick up water to form a water containing network.

Dendrimers having acid terminal groups can be linked through amido or imido bridges under various reaction conditions, using amide or imide group-containing linking compounds. These include poly- and di-functional amines which can react with the acid groups on at least two different dendrimers to form a network polymer that can be cast into a membrane. This approach leads to a random covalent network. Suitable diamine linking compounds include diaminoaryl compounds, diaminoalkane compounds, and diaminoalkene compounds. Particularly preferred diamines include 1,4-diaminobenzene and 1,2-diaminoethane. One route to these diamine bridged species is to convert the carboxylic acid terminal groups of the dendrimers into acid chloride groups, followed by reacting the acid chlorides with the diamine. The carboxylic acid groups can be converted to the acid chloride by reaction with $SOCl_2$. The diamine then reacts with the terminal acid chloride to eliminate HCl and form the diamine bridged dendrimers. FIG. 2 shows a representation of a portion of a membrane according to the present invention comprised of spherical dendrimers covalently linked with diamine compounds.

Alternatively, the dendrimers may be linked by an alcohol group-containing compound. Suitable alcohol group-containing linking compounds include 1,4-dihydroxy benzene, 4,4'-dihydroxybiphenyl, ethylene glycol, polyethylene glycol, and the like.

In another embodiment of the invention, membranes can be composed of dendrimers having halide or hydroxyl terminal groups substituted for a portion of the acid functional terminal groups. The halide or hydroxyl terminal groups then serve as reacting points that are used to covalently link the dendrimers through cross-coupling reactions. For example a dendrimer having a bromide terminal group may be formed as follows: 1 equivalent of 4-chloro-1-bromomethyl benzene can be reacted with 1 equivalent of 4-bromomethyl-1-(N,N-dimethyl-sulfonamido)benzene and 1 equivalent of 3,5-dihydroxybenzyl alcohol in the presence of 18-crown-6 and potassium carbonate in refluxing acetone. This mixed first generation dendrimer can then be reacted with 1 equivalent of a first generation alcohol and 1 equivalent of dihydroxy benzyl alcohol in the presence of 18-crown-6 and potassium carbonate to provide a second generation dendrimer with 1 halide group. This can be bromated and carried through to higher generations in a manner similar to those previously described. Similar methodology was used to prepare a Br functionalized dendrimer by Z. Bo, A. Schafer, P. Franke, and A. D. Schluter, in Org. Lett. (2000) 2, 1645, which is herein incorporated by reference.

Dendrimers having both acid and halide or hydroxyl terminal groups, including Frechét-type dendrons based on 3,5-dihydroxybenzyl alcohol with carboxylic acid and halide, (e.g., chloride, bromide and iodide) terminal groups, can be selectively cross-coupled to form stable covalent links between the halide-modified terminal groups on the dendrimers. Such cross-coupling reactions are well known in the art and include, but are not limited to, Suzuki coupling (reaction of arylboronic acids with aryl halides catalyzed by Pd complexes such as $Pd(PPh_3)_4$), Stille coupling (reaction of a trialkyl tin complex with an aryl or allyl halide to eliminate a trialkyl tin halide and form a carbon-carbon bond), Kumada coupling (reaction of a 3,5-dibromo aryl species with 2 equivalents of an aryl-Grignard reagent in the presence of Ni(II) to provide an aryl bridge between the aryl components of the Grignard reagent), Ulmann coupling (reaction of an aryl halide with a second aryl halide or alcohol in the presence of Cu to produce a diaryl species or diaryl ether species), and related coupling reactions for the formation of specific covalent biphenyl bridges between the aryl polyether groups of dendrimers. For example, palladium-imidazol-2-ylidene complexes can be used as catalysts for the facile and efficient Suzuki cross-coupling between unactivated aryl chlorides and aryl diboronic acids. Efficient cross-coupling also occurs between unactivated aryl chlorides and aryl Grignard reagents like 1,4-bis(bromomagnesium)benzene using a palladium-imidazolium chloride catalyst system in the Kumada reaction. This chemistry can be further extended to include Stille cross-coupling between aryl chlorides and aryl distannyl reagents like 1,4-bis(tributyltin)benzene using a tris(t-butyl)phosphine-palladium catalyst system. Diaryl ether bridges, as opposed to biphenyl bridges, between dendrimers can be readily synthesized by either a copper- or a palladium-catalyzed Ulmann diaryl ether synthesis between aryl bromides or iodides and bisphenols like 1,4-dihydroxybenzene.

Conversely, if the dendrimers are terminated with carboxylic acid and hydroxyl terminal groups, then the dendrimers can be crosslinked via Ulmann diaryl ether synthesis, facilitated using 1,4-dihalobenzenes. Methods for making these compounds, including methods similar to those described above to forming halide terminated dendrimers, are well known in the art. A method for making hydroxyl terminated dendrimers is described by C. Kim, S. Son, and B. Kim, in J. Organomet. Chem. (1999) 588, 1, and H. Ihre, A. Hult, and J. M. J. Frechet, I. Gitsov, in Macromolecules (1998) 31, 4061, which are herein incorporated by reference.

Membranes composed of dendronized copolymers are also contemplated by the present invention. These membranes, which are made from dendrimers having both acid terminal groups and polymerizable terminal groups, are covalently linked by polymerization reactions between the polymerizable terminal groups on the dendrimers. Polymerizable terminal groups include, but are not limited to, vinyl, styrene, methacrylates, urethanes, amides, imides, thiophenes, and aryl alkynes. For example, Frechét-type dendrons based on 3,5-dihydroxy-benzyl alcohol or related di- and trihydroxybenzyl alcohols can be reacted with 4-bromostyrene in a copper or palladium catalyzed Ulmann ether synthesis to generate macromonomers that in turn can be polymerized like polystyrene to generate dendrimers that contain styrene groups at some of the termini. The styrene groups in turn can be polymerized to generate dendronized copolymers.

Once the dendrimers are covalently linked either through the use of a cross-linking compounds, through cross-coupling reactions, or through copolymerization to form a polymer network, the polymer network is cast into a membrane. In one embodiment the membranes have a thickness of between about 0.02 and about 0.2 millimeters. The dendrimers may be cast into membranes by methods well known in the art. The suitability of a given method will depend upon the properties of the dendrimer. Examples of suitable methods include, but are not limited to, solution casting, melt casting, and spin casting.

One aspect of the invention provides dendrimer-ionic liquid composite membranes. In these membranes, ionic liquids, such as substituted imidazole salts, are imbibed in the membrane as a functional replacement of the water present in the membranes. High-boiling point ionic liquids can function as nonaqueous, mechanistic alternatives to water for proton conductivity through the membranes, thus allowing for high temperature operation without loss of the conducting liquid in the pores. Dendrimer-ionic liquid composites that do not depend upon water hydration for proton conductivity can produce protons without methanol crossover in temperature regimes greater than 100° C. Examples of ionic liquids are substituted imidazole salts, such as 1-n-butyl-3-methylimidazolium and 1-ethyl-3-methylimidazolium. These salts can be trapped in any of the dendrimer membranes described above (e.g. the Frechét-type dendrimer linked with amido bridges) by including them in the reaction mixture during the linking process.

Any membranes fabricated using the type of dendrimers described above or related dendrimers having discrete and controllable polymeric architectures are important to the construction of a fuel cell. In its simplest construction, a fuel cell is made up of a thin, solid polymer electrolyte that is pressed between two electrocatalyst layers, an anode and a cathode layer. This is a membrane electrode assembly (MEA), and the membrane functions as a protonic conductor, an electrical insulator and a barrier separating the reactant feed streams to the anode and cathode. Electrical current flows from the anode to the cathode, completing useful mechanical work as it does so. This is largely true whether the fuel cell oxidizes hydrogen generated from the reforming of hydrocarbons or oxidizes methanol directly in a direct methanol fuel cell. The use of these dendrimers as nano- or mesoscale objects to fabricate a larger membrane superstructure is readily possible, with the particular advantage that the thickness of the active layers of the membrane can be minimized within the MEA. A fuel cell fabricated using such dendrimers will be able to operate at higher temperatures (>100° C.) due to better water management within the membrane. Methanol crossover will also be reduced or eliminated when such a membrane is used in a direct methanol fuel cell. Each individual fuel cell can be placed in series to form a stack, and several stacks together generate the electrical energy necessary for mobile and portable power applications. In particular, polymer electrolyte membranes may be useful for transportation applications. The operating parameters of the fuel cell are determined by the fuel. As previously discussed, the fuel can be hydrogen, methanol, or reformate (a gas containing hydrogen, carbon monoxide, carbon dioxide and water prepared from hydrocarbon feeds) which will have to be cleaned up before entering the fuel cell. Consequently, a power plant using a direct methanol fuel cell is simple in construction; reforming hydrocarbon fuels to generate hydrogen on demand currently requires much more ancillary equipment, e.g., a reformer reactor, a sulfur removal catalytic reactor, a high and a low temperature water-gas shift catalytic reactor, and a catalytic reactor for the preferential oxidation of CO in $H_2$-rich feed streams.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

The invention is described in more detail in the following non-limiting examples.

EXAMPLE 1

Production of a Membrane Made from Diamine-Linked FrechéT-Type Dendrimers

Frechét-type dendrimers are formed as described by Hawker et al. in J. Chem. Soc. Perkin Trans. (1993) 1, 1287. Such dendrimers are formed by reacting two equivalents of methyl-p-bromomethylbenzoate with 3,5-dihydroxybenzyl alcohol in the presence of 18-crown-6 and potassium carbonate in refluxing tetrahydrofuran (THF). The resulting first generation (G1) alcohol is converted to the bromide in an 83 percent yield by reaction with carbon tetrabromide/triphenylphosphine. Reaction of two equivalents of this bromide with 3,5-dihydroxybenzyl alcohol leads to the second generation dendrimer in a 91 percent yield. These steps are repeated to get to generation 3, then 4 dendrimers in yields of about 85 percent. At generation 4, two equivalents of brominated generation 4 dendrimer are reacted with 4,4'-dihydroxybiphenyl in refluxing THF to provide a [G4]-O—$C_6H_5$—O-[G4] macromolecule in an 81 percent yield after purificatin by flash chromatography. The methyl ester groups are then converted by reaction with excess potassium hydroxide to provide the carboxy terminated dendrimer.

After the dendrimers are formed they are covalently linked to produce a network structure. This is accomplished by first converting a portion of the carboxylic acid terminal groups on the dendrimers into acid chloride groups by reacting 8.5 grams of the [G4]-O—$C_6H_5$—$C_6H_5$—O-[G4] macromolecule with 0.9 grams of $SOCl_2$ in refluxing THF. Approximately 0.5 grams of 1,2-diaminoethane is then added to the reaction mixture and allowed to react with the acid chloride-terminated dendrimers overnight to form a network structure of diamine bridged dendrimers.

Finally, the dendrimer network is cast into a membrane. This is accomplished by dissolving 2–5 grams of the dendrimer network (depending on the film thickness desired) in 100 ml of THF, pouring the solution into a petri dish with a diameter of 2–4", and slowly evaporating the solvent. Initial evaporation is performed in air, followed by vacuum evaporation at about 50° C. Finally, the film is removed and pressed between two teflon sheets at around 80–100° C. and 500–1000 psi.

EXAMPLE 2

Production of a Membrane Made from Diamine Linked FrechéT-Type Dendrimers

Frechét-type dendrimers are formed as described by Forier et al. in Tetrahedron (1999) 55, 9829. Such dendrimers are formed by adding 6.9 grams of methanesulphonyl chloride to 4,8 grams of a G-1 alcohol, which is produced as described in Example 1 above, and 7.6 grams of triethyl amine in 50 ml of dry dichloromethane at –10° C. under a nitrogen atmosphere. The mixture is stirred for one hour then poured over a mixture of 100 ml of crushed ice and 10 ml of concentrated hydrochloric acid (HCl). The organic layer is then separated, washed with an $NaHCO_3$ solution, dried over $MgSO_4$, and evaporated. The product is recrystallized from diethyl ether to give a [G1]-$OSO_2CH_3$ product at an 87 percent yield.

Higher generation dendrimers are prepared in a similar manner. Specifically, the [G2] alcohol is prepared from the [G1]-$OSO_2CH_3$ by refluxing in an acetone solution (70 ml) containing 7 grams of the [G1]-$OSO_2CH_3$, 0.82 grams of 3,5-dihydroxybenzyl alcohol, 4.9 grams of $K_2CO_3$ and 0.1 grams of 18-crown-6 overnight under a nitrogen atmosphere. The reaction mixture is poured into 300 ml of water and extracted with dichloromethane. The combined extracts are dried over $MgSO_4$, then evaporated and the residue chromatographed on silica gel with dichloromethane/diethyl ether (20:1) to give the [G2]-OH in 87 percent yield (3.8 g). The [G2]-OH is converted to the [G2]-$OSO_2CH_3$ by adding 2.5 grams of methanesulphonyl chloride to a 50 ml dichloromethane solution containing 3.9 grams of the [G2]-OH and 2.7 grams of triethyl ammine. The product is recrystallized from diethyl ether to give the [G2]-OSO$_2$CH$_3$ in 87 percent yield (3.8 g). From this product, the [G3]-OH is prepared. A mixture containing 2.5 grams of the [G2]-OSO$_2$CH$_3$, 0.14 grams of 3,5-dihydroxybenzyl alcohol, 0.85 grams of K$_2$CO$_3$ and 0.1 grams of 18-crown-6 is refluxed in 40 ml of dry acetone overnight. The residue is chromatographed on silica gel with dichloromethane/diethyl ether (25:1) to give the product in 85 percent yield. This is converted to the [G3]-OSO$_2$CH$_3$ by adding 0.4 grams of triethyl ammine and 0.4 grams of methanesulphonyl chloride to 1.2 grams of the [G3]-OH in 20 ml of dry dichloromethane. The crude material is chromatographed to provide the [G3]-OSO$_2$CH$_3$ in 85 percent yield. This product is then converted to the [G4]-OH. A mixture containing 1.5 grams of [G3]-OSO$_2$CH$_3$, 0.042 grams of dihydroxybenzyl alcohol, 0.85 grams of K$_2$CO$_3$ and 0.1 grams of 18-crown-6 is refluxed in 40 ml of dry acetone. The residue is chromatographed on silica gel with dichlorometrhane/diethyl ether to give the [G4]-OH in an 84 -percent yield. (0.82 g) The [G4]-OSO$_2$CH$_3$ is prepared by adding 0.11 grams of methanesulphonyl chloride to a 20 ml dichloromethane solution containing 0.8 grams of the [G4]-OH and 0.13 grams of triethyl amine. The product is recrystallized from diethyl ether to give the [G4]-OSO$_2$CH$_3$ in 87 percent yield (0.71 g).

To form a spherical dendrimer, the [G4]-OSO$_2$CH$_3$ is reacted with 4,4'-biphenol. In refluxing acetone solution (70 ml), 3 grams of the [G4]-OSO$_2$CH$_3$ is reacted with 0.055 grams of 4,4'-biphenol, 0.18 grams of K$_2$CO$_3$, and 0.1 grams of 18-crown-6 overnight under a nitrogen atmosphere. The residue is chromatographed on silica gel with dichloromethane/diethyl ether (25:1) to give the [G4]-O—C$_6$H$_5$—C$_6$H$_5$—O-[G4] complex in 85 percent yield (1.7 g). A THF solution containing 0.7 grams of this dendrimer in 50 ml of THF is added dropwise to a suspension of containing 0.36 grams of LiAlH$_4$ in 20 ml of THF. After refluxing for approximately 2 hours, the solution is treated with aqueous NaOH (1 M, 15 ml), filtered, and evaporated. The residue is chromatographed on a silica gel column with dichloromethane as the eluent to produce the carboxylic acid derivative in a yield of approximately 85 percent. This product is refluxed with 0.022 grams of SOCl$_2$ in THF, then 0.045 grams of 1,2-diaminoethane is added to the reaction mixture and allowed to react with the acid chloride-terminated dendrimers for approximately 2 hours to form a network structure of diamine bridged dendrimers. The solution is concentrated and poured onto a plate and the solvent is evaporated to provide a solid.

Finally, the dendrimer network obtained above is cast into a membrane. This is accomplished by placing 1–2 grams of the dendrimer network polymer between two teflon coated aluminum plattens. The plattens are placed in a Carver Laboratory Press (Model C) preheated to 200–220° C. After the material softens, the plattens are subjected to a pressure of 2,500–5,000 psi for approximately 1 minute. The pressure is released and the aluminum platens removed from the press and allowed to cool. The dendrimer membrane can then be carefully removed form between the plattens.

While preferred embodiments have been illustrated and described, it should be understood that changes and modifications can be made therein in accordance with ordinary skill in the art without departing from the invention in its broader aspects as defined in the following claims.

What is claimed is:

1. A method for preparing an ion-conducting membrane comprising the steps of:
   (a) reacting a linking compound with a plurality of dendrimers, having acid functional terminal groups, to form a covalently linked polymer; and
   (b) casting the polymer into an ion-conducting membrane, wherein the ion-conducting membrane has an acid equivalent weight between about 150 and about 500.

2. The method of claim 1, wherein the acid functional terminal groups are selected from the group consisting of carboxylic acids, carboxylic acid derivatives, sulfonic acid functional terminal groups, sulfonic acid derivatives, phosphonic acid functional terminal groups, and phosphonic acid derivatives.

3. The method of claim 1, wherein the acid functional terminal group is a carboxylic acid.

4. The method of claim 1, wherein the linking compound is selected from the group consisting of, polyfunctional amines, and alcohol group-containing linking compounds.

5. The method of claim 4, wherein the polyfunctional amine is a diaminoaryl compound, diaminoalkane, or diaminoalkene.

6. The method of claim 1, further comprises adding water or exposing the covalently linked polymer to humidified air.

7. The method of claim 1, wherein the ion conducting membrane further comprises an ionic liquid.

8. The method of claim 1, wherein the dendrimers are Frechét type dendrimers.

9. The method of claim 1, wherein the ion conducting membrane is thermally stable at temperatures between about 100° C. and about 200° C.

10. The method of claim 1, wherein the ion conducting membrane has an acid equivalent weight between about 200 and about 400.

11. The method of claim 1, wherein at least some of the dendrimers are fluorinated.

12. The method of claim 1, wherein the acid functional terminal group is a methyl ester and the method further comprises converting the methyl ester to a carboxylic acid.

* * * * *